(12) United States Patent
Steffens, Jr. et al.

(10) Patent No.: US 6,273,458 B1
(45) Date of Patent: Aug. 14, 2001

(54) INFLATABLE CURTAIN

(75) Inventors: Charles E. Steffens, Jr., Washington; Ernst M. Faigle, Dryden, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/584,635

(22) Filed: May 31, 2000

(51) Int. Cl.[7] .................................................. B60R 21/22
(52) U.S. Cl. ......................................... 280/730.2; 280/749
(58) Field of Search ............................... 280/730.2, 733, 280/749, 748, 753, 751, 730.1

(56) References Cited

U.S. PATENT DOCUMENTS

| | | |
|---|---|---|
| 3,687,485 | 8/1972 | Campbell . |
| 5,265,903 | 11/1993 | Kuretake et al. . |
| 5,333,898 | 8/1994 | Stutz . |
| 5,462,308 | 10/1995 | Seki et al. . |
| 5,588,672 | 12/1996 | Karlow et al. . |
| 5,660,414 | 8/1997 | Karlow et al. . |
| 5,707,075 | 1/1998 | Kraft et al. . |
| 5,788,270 | 8/1998 | Haland et al. . |
| 5,865,462 | 2/1999 | Robins et al. . |
| 6,095,551 * | 8/2000 | O'Docherty ........................ 280/730.2 |
| 6,155,597 * | 12/2000 | Bowers et al. ..................... 280/730.2 |
| 6,168,193 * | 1/2001 | Shirk et al. ........................ 280/730.2 |
| 6,168,194 * | 1/2001 | Cuevas et al. ..................... 280/730.2 |
| 6,176,515 * | 1/2001 | Wallner et al. .................... 280/730.2 |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

Apparatus (10) for helping to protect an occupant of a vehicle (12) that has a side structure (16) and a roof (18) comprises an inflatable vehicle occupant protection device (14). The inflatable vehicle occupant protection device (14) is inflatable from a stored position into a position between the side structure (16) of the vehicle (12) and a vehicle occupant. An inflation fluid source (24) provides inflation fluid for inflating the inflatable vehicle occupant protection device (14). The apparatus (10) includes a guide (90) connected to the inflatable vehicle occupant protection device (14) and a flexible elongated member (70) that extends through the guide. The flexible elongated member (70) has a first end (72) connected to the vehicle (12) at a first location (76) and an opposite second end (74) connected to the vehicle at a second location (82). The guide (90) is movable over the flexible elongated member (70) in a first direction (122) when the inflatable vehicle occupant protection device is inflated and the guide resists movement over the flexible elongated member in a second direction (124), opposite the first direction.

27 Claims, 4 Drawing Sheets

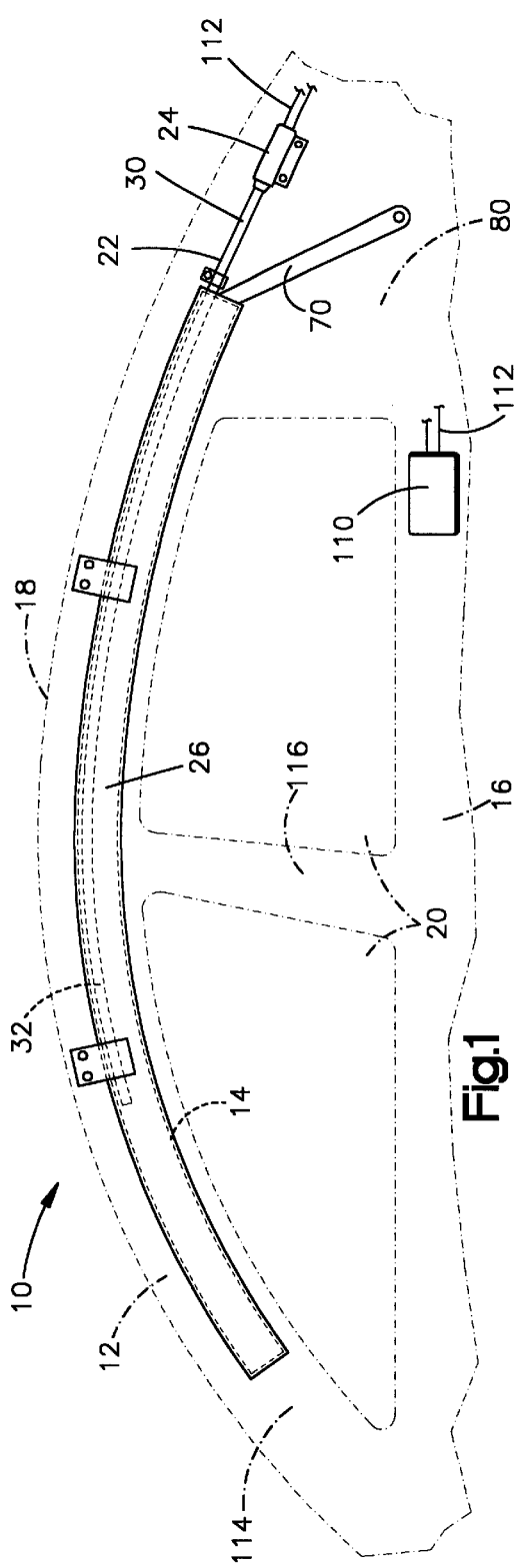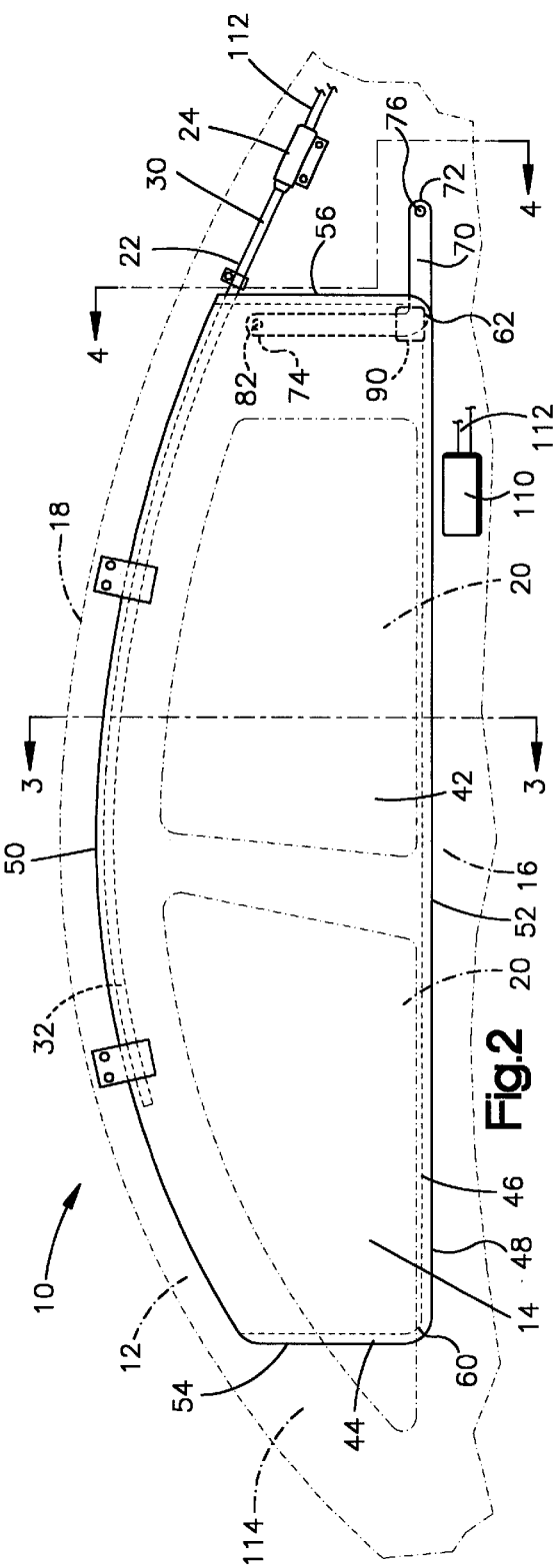

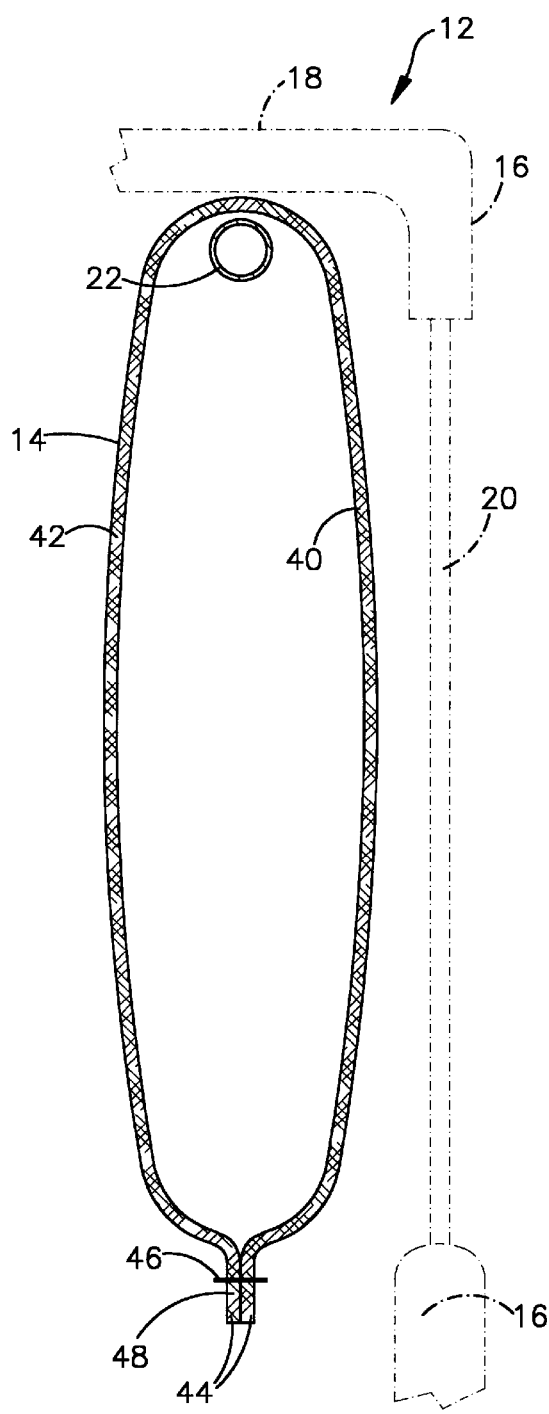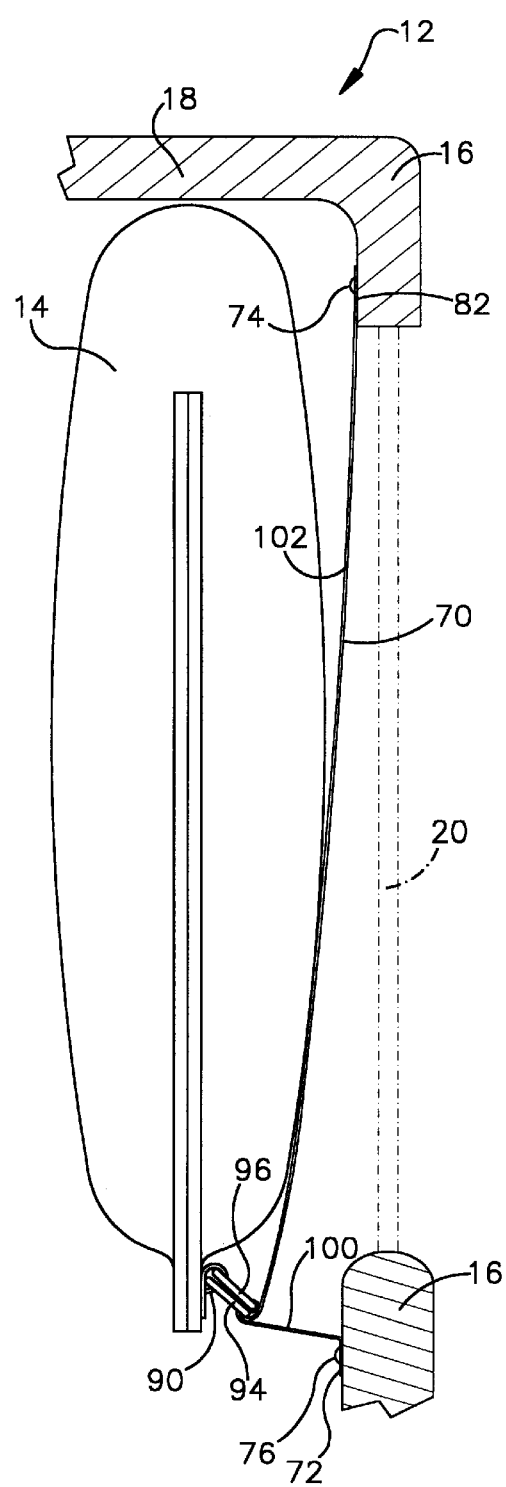

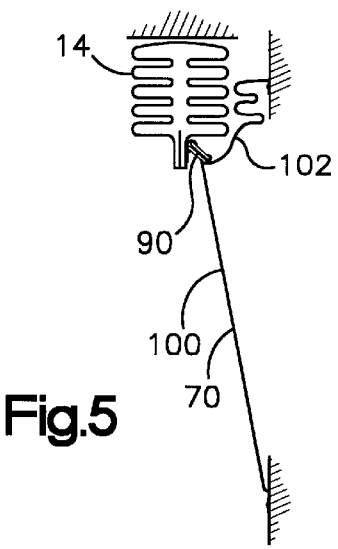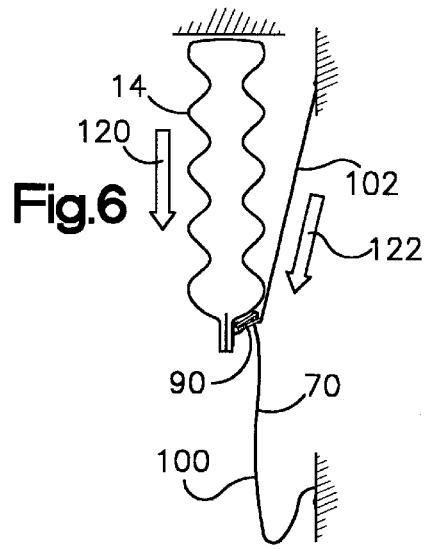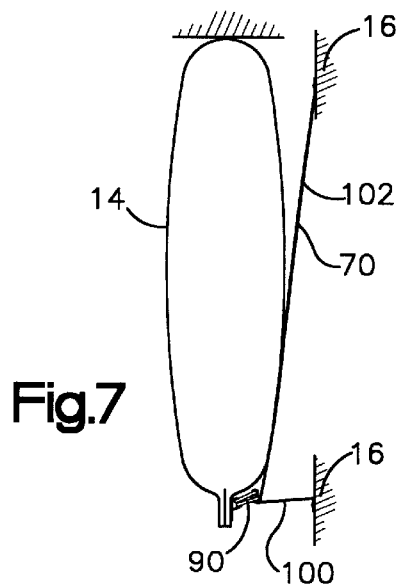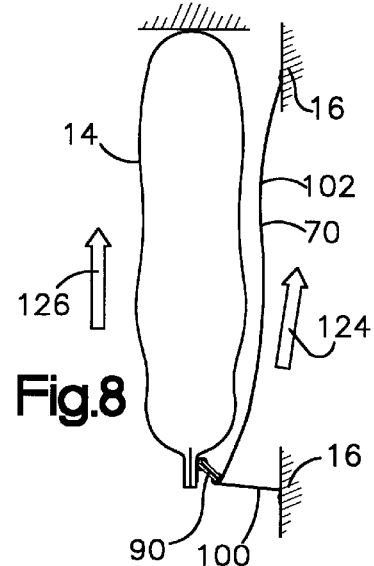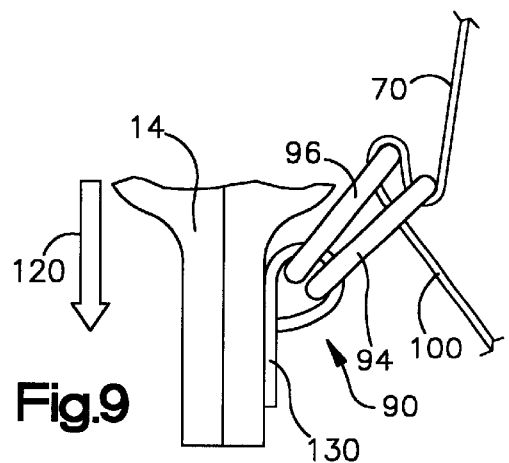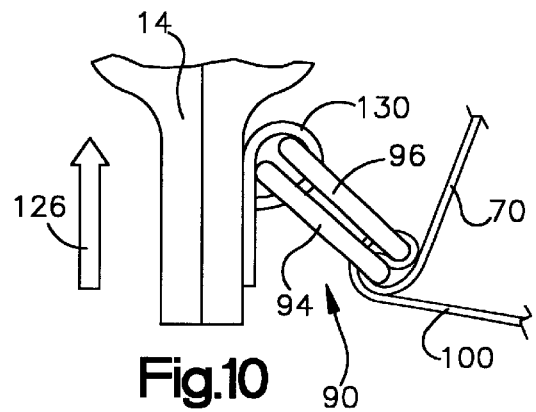

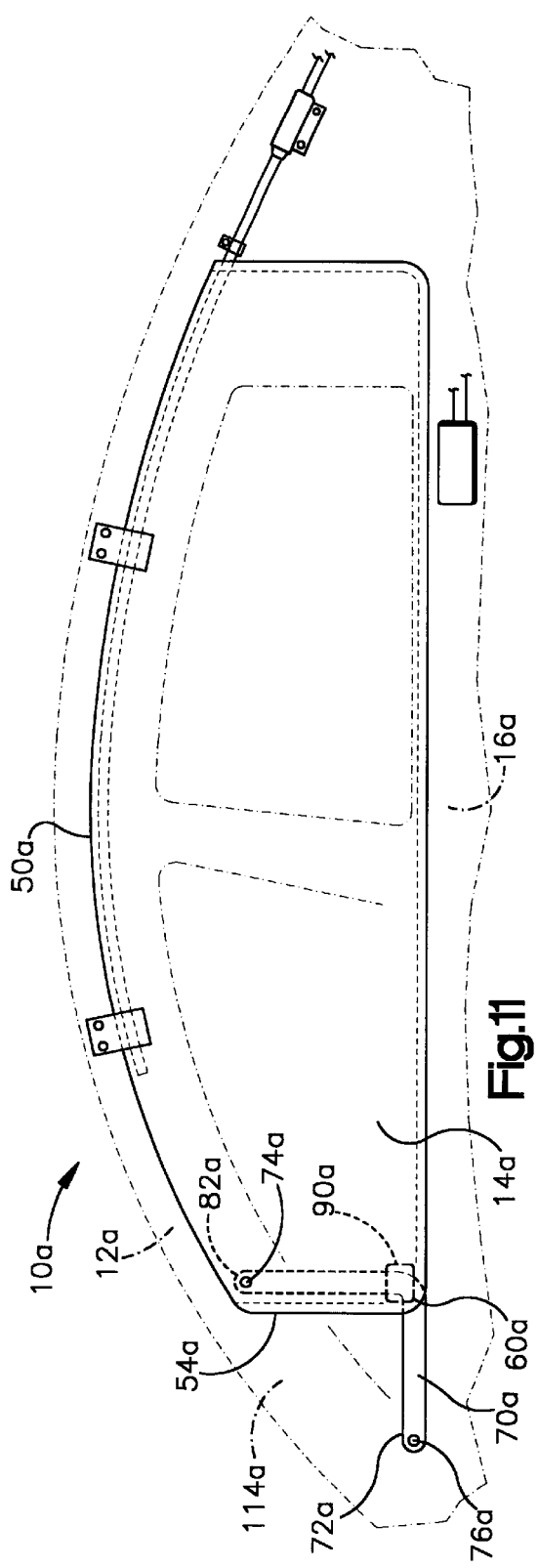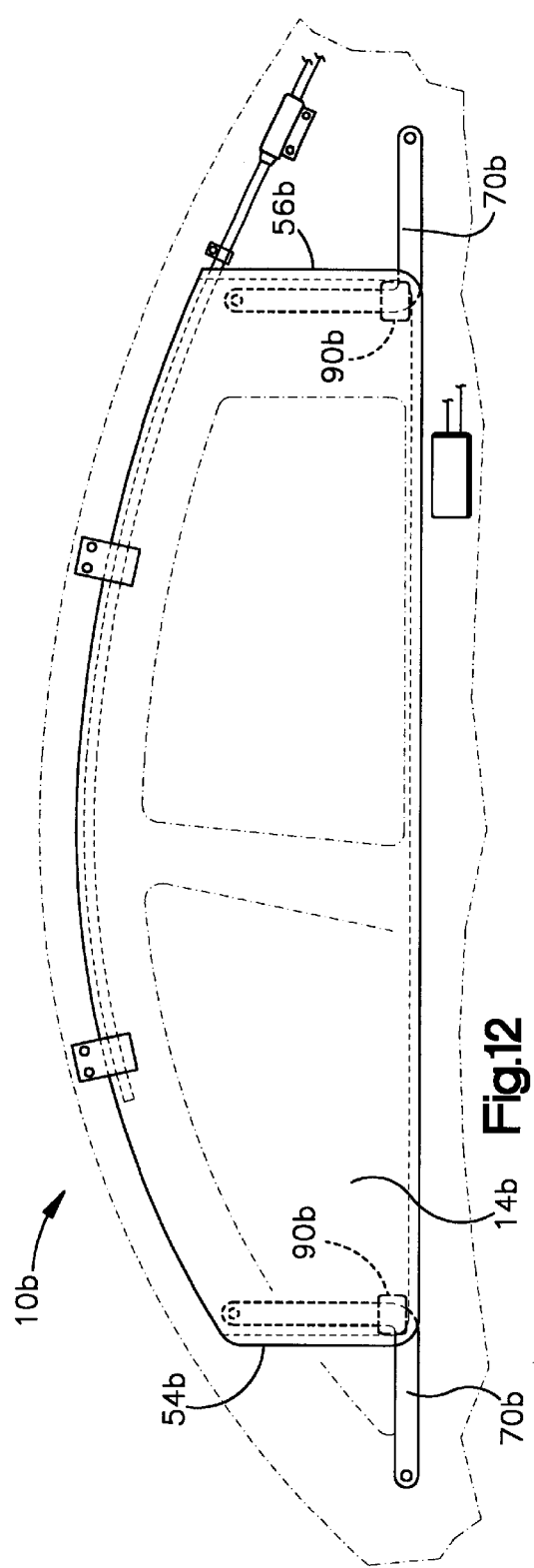

INFLATABLE CURTAIN

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure. The apparatus includes an inflatable vehicle occupant protection device that is inflatable from a stored position into a position between the side structure of the vehicle and a vehicle occupant. An inflation fluid source provides inflation fluid for inflating the inflatable vehicle occupant protection device.

The apparatus includes a guide connected to the inflatable vehicle occupant protection device and a flexible elongated member that extends through the guide. The flexible elongated member has a first end connected to the vehicle at a first location and an opposite second end connected to the vehicle at a second location. The guide is movable over the flexible elongated member in a first direction when the inflatable vehicle occupant protection device is inflated and the guide resists movement over the flexible elongated member in a second direction, opposite the first direction.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus for helping to protect a vehicle occupant illustrating the apparatus in a deflated condition;

FIG. 2 is a schematic view of the apparatus of FIG. 1 in an inflated condition;

FIG. 3 is a sectional view of the apparatus taken generally along line 3—3 in FIG. 2;

FIG. 4 is a sectional view of the apparatus taken generally along line 4—4 in FIG. 2 with certain parts omitted;

FIGS. 5–8 are schematic views of the apparatus of FIGS. 1 and 2 illustrating the apparatus at various stages during the operation of the apparatus;

FIG. 9 is an enlarged view of a portion of the apparatus of FIG. 2;

FIG. 10 is an enlarged view of a portion of the apparatus of FIG. 2;

FIG. 11 is a schematic view of an inflatable apparatus for helping to protect a vehicle occupant according to a second embodiment of the present invention; and FIG. 12 is a schematic view of an inflatable apparatus for helping to protect a vehicle occupant according to a third embodiment of the present invention.

DESCRIPTION OF PREFERRED EMBODIMENTS

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14. The inflatable curtain 14 has a stored position in which the curtain is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The apparatus 10 includes a housing 26 (FIG. 1) that stores the inflatable curtain 14 in a stored position prior to inflation of the curtain. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. overlapping portions 44 of the first and second panels 40 and 42 are secured together by stitching 46 (FIGS. 2 and 3) that extends along a portion of the perimeter 48 of the inflatable curtain 14.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels to form the inflatable curtain 14. The first and second panels 40 and 42 may also be woven together to form the inflatable curtain 14.

The first and second panels 40 and 42 are constructed of a fabric, such as nylon, that is coated with a gas impermeable material such as urethane or silicone to form an inflatable volume. The inflatable curtain 14 thus has a substantially gas-tight construction. Other materials, such as elastomers, plastic films, or combinations thereof may also be used to construct the inflatable curtain 14. The first and second panels 40 and 42 may also be formed of single or multi-layered sheets of material.

The perimeter 48 (FIG. 2) of the inflatable curtain 14 is defined by upper and lower edges 50 and 52, respectively, of the curtain and horizontally spaced front and rear edges 54 and 56, respectively, of the curtain. The front and rear edges 54 and 56 of the inflatable curtain 14 extend from the upper edge 50 to the lower edge 52 of the curtain. A bottom front corner 60 of the inflatable curtain 14 is defined by the intersection of the front edge 54 and the lower edge 52 of the curtain. A bottom rear corner 62 of the inflatable curtain 14 is defined by the intersection of the rear edge 56 and the lower edge 52 of the curtain. Although the front and rear edges 54 and 56 of the inflatable curtain 14 are illustrated as being generally vertical, the front edge of the curtain, in particular, could be formed by extending the upper and lower edges 50 and 52 until they intersect. In such a case, the bottom front corner 60 would be defined by the intersection of the upper and lower edges 50 and 52.

The apparatus 10 (FIGS. 1 and 2) also includes a flexible elongated member 70 that connects the inflatable curtain 14 to the side structure 16 of the vehicle 12. The flexible elongated member 70 preferably comprises a tether constructed of a material such as fabric. The flexible elongated member 70 could, however, have alternative constructions such as a rope, webbing, or a cable. In the deflated condition of the inflatable curtain 14 (FIG. 1), at least a portion of the flexible elongated member 70 is stored in the housing 26 along the vehicle roof 18 and side structure 16 of the vehicle 12 above the side windows 20. Also, the portion of the flexible elongated member 70 not stored in the housing 26 is preferably covered by a suitable trim piece.

As illustrated in FIG. 2, the flexible elongated member 70 has a first end 72 and an opposite second end 74. The first end 72 of the flexible elongated member 70 is fixedly connected to the side structure 16 of the vehicle 12 at a first location 76. The first location 76 is positioned rearward of the rear edge 56 of the inflatable curtain 14, for example on or near a C pillar 80 of the vehicle 12.

The second end 74 of the flexible elongated member 70 is secured to the vehicle side structure 16 at a second location 82. The second location 82 is positioned adjacent the upper edge 50 of the inflatable curtain 14, near the intersection of the upper edge and the rear edge 56 of the curtain. The second location 82 may be on the C pillar 80 of the vehicle 12. The second location 82, however, may have any desired position and may, for example, be positioned near the upper edge 50 and spaced away from the rear edge 56.

As illustrated in FIG. 4, the first and second ends 72 and 74 of the flexible elongated member 70 are connected directly to the vehicle side structure 16. The first and second ends 72 and 74 may, however, be connected to any desired part of the vehicle 12 that provides a structural linkage to the vehicle side structure 16. For example, the second end 74 could be connected to the housing 26 (FIG. 1).

The apparatus 10 (FIG. 2) includes a guide 90 located on the inflatable curtain 14 near the bottom rear corner 62 of the curtain. The guide 90 may, however, be connected to the inflatable curtain 14 at any desired location on the curtain. For example, the guide 90 may be positioned adjacent the lower edge 52 of the inflatable curtain 14 and spaced away from the rear edge 56 of the curtain. Alternatively, the guide 90 may be spaced away from both the rear edge 56 and the lower edge 52 of the inflatable curtain 14.

As illustrated in FIG. 4, the flexible elongated member 70 extends from the first location 76 through the guide 90 and to the second location 82. The guide 90 is preferably a one-way slider device constructed such that the guide slides easily over the flexible elongated member 70 in a first direction and is blocked from sliding over the flexible elongated member in a second direction, opposite the first direction. The operation of the guide 90 will be described below in greater detail.

In the embodiment illustrated in FIG. 4, the guide 90 includes first and second rings 94 and 96, respectively, through which the flexible elongated member 70 extends. The guide 90 may, however, have an alternative configuration. In fact, the guide 90 may be of any configuration in which the guide is permitted to slide over the flexible elongated member 70 in the first direction and is blocked from sliding over the flexible elongated member in the second direction.

As illustrated in FIGS. 4 and 9, the flexible elongated member 70 extends from the first location 76, through the first and second rings 94 and 96, around the second ring 96, back through the first ring 94, and then to the second location 82. A first portion 100 of the flexible elongated member 70 extends between the first location 76 and the guide 90. A second portion 102 of the flexible elongated member 70 extends between the second location 82 and the guide 90.

The vehicle 12 includes a sensor mechanism 110 (shown schematically in FIGS. 1 and 2) for sensing a side impact to the vehicle 12 and/or a rollover of the vehicle 12. The sensor mechanism 110 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 110 provides an electrical signal over lead wires 112 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 inflates away from the stored position. In the embodiment illustrated in FIG. 1, the inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 is positioned adjacent to the intersection of the roof 18 and the side structure 16 of the vehicle 12. The front edge 54 is positioned adjacent to an A pillar 114 of the vehicle 12. The rear edge 56 of the inflatable curtain 14 is positioned adjacent to the C pillar 80 of the vehicle 12. The inflatable curtain 14 extends between the A pillar 114 and the C pillar 80 of the vehicle 12 and overlies at least a portion of the A pillar, C pillar, and a B pillar 116 of the vehicle.

It will be recognized by those skilled in the art that the inflatable curtain 14 may have alternative configurations. For example, in the illustrated embodiment, the inflatable curtain 14 extends between the A pillar 114 and the C pillar 80 of the vehicle 12. The inflatable curtain 14 could, however, extend between the A pillar 114 and the B pillar 116 only or between the B pillar and the C pillar 80 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When inflated, the inflatable curtain 14 is positioned along the side structure 16 of the vehicle 12 and helps to absorb the energy of impacts with the inflatable curtain and to distribute the impact energy over a large area of the curtain. The inflatable curtain 14 also helps to prevent any occupants of the vehicle from being ejected during a side impact or a vehicle rollover.

As the inflatable curtain 14 moves from the stored position of FIG. 1 to the inflated position of FIG. 2, the guide 90 slides over the flexible elongated member 70. This is best illustrated in FIGS. 5–8. FIGS. 5–8 illustrate the operation of the inflatable curtain 14, guide 90 and flexible elongated member 70 at various times before, during and after inflation of the curtain.

FIG. 5 illustrates the inflatable curtain 14 in the stored position prior to inflation. in FIG. 5, the inflatable curtain 14 is illustrated as having an accordion-style fold. It will be recognized by those skilled in the art, however, that the inflatable curtain 14 may be folded in any manner suitable for storing the curtain. In the stored position, the first portion 100 of the flexible elongated member 70 is tensioned, and the second portion 102 is slacked.

As illustrated in FIG. 6, as the inflatable curtain 14 is inflated, the curtain moves in a downward direction indicated generally by the arrow 120 in FIG. 6. As the inflatable curtain 14 moves in the downward direction, the first portion 100 of the flexible elongated member 70 becomes slacked and the slack in the second portion 102 is taken up. When the inflatable curtain 14 has moved a given distance in the downward direction, the curtain reaches a predetermined position illustrated in FIG. 6. When the inflatable curtain is in the predetermined position, the second portion 102 of the flexible elongated member 70 is tensioned, and the first portion 100 is slacked.

As the inflatable curtain 14 moves in the downward direction beyond the predetermined position, the guide 90 moves over the flexible elongated member 70 in a first direction indicated generally by the arrow 122 in FIG. 6. The guide 90 moves easily over the flexible elongated member 70 with relatively little resistance. As the guide 90 moves over the flexible elongated member 70, the slack in the first portion 100 is taken up. Thus, as the guide 90 moves over the flexible elongated member 70, the length of the second portion 102 increases, and the length of the first portion 100 decreases. The slack in the first portion 100 is taken up until the inflatable curtain 14 is inflated and the guide 90 stops moving over the flexible elongated member 70, as shown in FIG. 7.

When the inflatable curtain 14 is inflated, the flexible elongated member 70 helps to maintain the position of the curtain adjacent the vehicle side structure 16. This is illustrated in FIG. 8. The guide 90 blocks movement of the guide over the flexible elongated member in a second direction indicated by the arrow 124, opposite the first direction. By way of example, during a side impact or rollover, the inflatable curtain 14 may be acted on by a force that would tend to move the curtain in the upward direction indicated by the arrow 126 in FIG. 8. In this instance, the guide 90 would not move over the flexible elongated member 70 in the second direction, which would help to resist movement of the inflatable curtain 14 in the upward direction. Thus, the flexible elongated member 70 and the guide 90 would help to maintain the position of the inflatable curtain 14 adjacent the vehicle side structure 16 throughout the duration of a side impact or vehicle rollover. The flexible elongated member 70 and the guide 90 would also help to maintain the position of the inflatable curtain 14 even after the curtain begins to deflate after inflation.

As illustrated in FIGS. 9 and 10, the guide 90 includes a base 130 that connects the first and second rings 94 and 96 to the inflatable curtain 14. The first and second rings 94 and 96 are hingedly connected to the base 130 and may pivot with respect to the base. FIG. 9 illustrates the function of the guide 90 during inflation of the inflatable curtain 14 as viewed in FIG. 6. FIG. 10 illustrates the function of the guide 90 when the inflatable curtain 14 is inflated as viewed in FIG. 8.

As illustrated in FIG. 9, when the inflatable curtain is moving in the downward direction indicated by the arrow 120, the first and second rings 94 and 96 pivot to extend diagonally upward from the base 130. This reduces the degree to which the flexible elongated member 70 is curved as the member extends through and wraps around the first and second rings 94 and 96, which helps to facilitate smooth and easy movement of the guide 90 over the flexible elongated member in the first direction. Also, as the inflatable curtain 14 is inflated, the first portion 100 of the flexible elongated member 70 is slacked, which helps to maintain the flexible elongated member in loose engagement with the first and second rings 94 and 96. This also helps to facilitate smooth and easy movement of the guide 90 over the flexible elongated member 70 in the first direction.

As illustrated in FIG. 10, when the inflatable curtain is urged in the direction indicated by the arrow 126, the first and second rings 94 and 96 pivot to extend diagonally downward from the base 130. This increases the degree to which the flexible elongated member 70 is curved as the member extends through and wraps around the first and second rings 94 and 96, which helps to block movement of the guide 90 over the flexible elongated member in the second direction. Also, when the inflatable curtain 14 is inflated, the first portion 100 of the flexible elongated member 70 is tensioned, which helps to tighten the flexible elongated member around the first and second rings 94 and 96. This also helps to block movement of the guide 90 over the flexible elongated member 70 in the second direction.

A second embodiment of the present invention is illustrated in FIG. 11. The second embodiment of the invention is similar to the first embodiment of the invention illustrated in FIGS. 1–10. Accordingly, numerals similar to those of FIGS. 1–10 will be utilized in FIG. 11 to identify similar components, the suffix letter "a" being associated with the numerals of FIG. 11 to avoid confusion. The apparatus 10a (FIG. 11) of the second embodiment is identical to the apparatus 10 (FIGS. 1–10), except that the flexible elongated member 70a (FIG. 11) has a different position relative to the vehicle side structure 16a and the inflatable curtain 14a than the flexible elongated member 70 (FIGS. 1–10) of the first embodiment.

As illustrated in FIG. 11, the first end 72a of the flexible elongated member 70a is fixedly connected to the side structure 16a of the vehicle 12a at a first location 76a. The first location 76a is positioned forward of the front edge 54a of the inflatable curtain 14a, on or near the A pillar 114a of the vehicle 12a. The second end 74a of the flexible elongated member 70a is secured to the vehicle side structure 16a at a second location 82a. The second location 82a is positioned adjacent the upper edge 50a of the inflatable curtain 14a, near the intersection of the upper edge and the front edge 54a of the curtain. The second location may be on or near the A pillar 114a of the vehicle 12a. The guide 90a is located on the inflatable curtain 14a near the front bottom corner 60a of the curtain. The guide 90a is identical to the guide 90 (FIGS. 1–10) of the first embodiment.

A third embodiment of the present invention is illustrated in FIG. 12. The third embodiment of the invention is similar to the first and second embodiments of the invention illustrated in FIGS. 1–11. Accordingly, numerals similar to those of FIGS. 1–11 will be utilized in FIG. 12 to identify similar components, the suffix letter "b" being associated with the numerals of FIG. 12 to avoid confusion. The apparatus 10b (FIG. 12) of the third embodiment is identical to the apparatus 10 and 10a (FIGS. 1–11), except that the apparatus 10b (FIG. 12) includes flexible elongated members 70b positioned near both the front and rear edges 54b and 56b of the inflatable curtain 14b. The guides 90b of the third embodiment are identical to the guides 90 and 90a (FIGS. 1–11) of the first and second embodiments.

From the above description of the invention, those skilled in the art will perceive improvements, changes and modifications. For example, in the illustrated embodiments, the inflatable curtain is inflated from the stored position downward into a position between the side structure of the vehicle and an occupant of the vehicle. The inflatable curtain may, however, have a stored position such that the curtain inflates in an upward direction, in a forward direction, or in a rearward direction into the position between the side structure of the vehicle and the vehicle occupant. Such improvements, changes and modifications within the skill of the art are intended to be covered by the appended claims.

Having described the invention, the following is claimed:

1. Apparatus for helping to protect an occupant of a vehicle that has a side structure, said apparatus comprising:
    an inflatable vehicle occupant protection device that is inflatable from a stored position into a position between the side structure of the vehicle and a vehicle occupant;
    an inflation fluid source that provides inflation fluid for inflating said inflatable vehicle occupant protection device;
    a guide connected to said inflatable vehicle occupant protection device; and
    a flexible elongated member having a first end connected to the vehicle at a first location and an opposite second end connected to the vehicle at a second location, said flexible elongated member extending through said guide;
    said guide being movable over said flexible elongated member in a first direction when said inflatable vehicle occupant protection device is inflated, said guide resisting movement over said flexible elongated member in a second direction, opposite said first direction.

2. Apparatus as defined in claim 1, wherein said inflatable vehicle occupant protection device is an inflatable curtain, said inflatable curtain extending along the side structure adjacent to a roof of the vehicle when said inflatable curtain is in said stored position.

3. Apparatus as defined in claim 2, wherein said inflatable curtain is inflated from said stored position in a direction away from the vehicle roof.

4. Apparatus as defined in claim 2, wherein said flexible elongated member has a first portion extending between said first end and said guide and a second portion extending between said second end and said guide, said second portion being slacked when said inflatable curtain is in said stored position, said first portion being slacked and said second portion being tensioned when said inflatable curtain moves a given distance in a direction away from said stored position upon inflation of said inflatable curtain, said guide moving over said flexible elongated member in said first direction when said inflatable curtain moves farther than said given distance in said direction away from said stored position.

5. Apparatus as defined in claim 4, wherein said flexible elongated member helps to maintain said inflatable curtain in said position between the side structure of the vehicle and a vehicle occupant when said inflatable curtain is inflated.

6. Apparatus as defined in claim 5, wherein said flexible elongated member helps to maintain said inflatable curtain in said position between the side structure of the vehicle and a vehicle occupant after said inflatable curtain begins to deflate.

7. Apparatus as defined in claim 6, wherein said inflatable curtain, when inflated, helps to prevent ejection of an occupant during one of a side impact and a vehicle rollover.

8. Apparatus as defined in claim 4, wherein said first portion has a length that decreases and said second portion has a length that increases as said guide moves over said flexible elongated member in said first direction.

9. Apparatus as defined in claim 8, wherein said first and second portions are tensioned when said inflatable curtain is inflated.

10. Apparatus as defined in claim 2, wherein said inflatable curtain includes an upper edge, an opposite lower edge, and front and rear edges spaced apart horizontally along said upper and lower edges, said upper edge being positioned adjacent the intersection of the side structure of the vehicle and the vehicle roof when the inflatable curtain is inflated.

11. Apparatus as defined in claim 10, wherein said first location is rearward of said rear edge of said inflatable curtain, on or near a C pillar of the vehicle.

12. Apparatus as defined in claim 11, wherein said guide is positioned near a rear lower corner of said inflatable curtain, said rear lower corner being defined by the intersection of said rear edge and said lower edge of said inflatable curtain.

13. Apparatus as defined in claim 12, wherein said second location is near said rear edge and said upper edge of said inflatable curtain.

14. Apparatus as defined in claim 10, wherein said first location is forward of said front edge of said inflatable curtain, on or near an A pillar of the vehicle.

15. Apparatus as defined in claim 14, wherein said guide is positioned near a front lower corner of said inflatable curtain, said front lower corner being defined by the intersection of said front edge and said lower edge of said inflatable curtain.

16. Apparatus as defined in claim 15, wherein said second location is near said front edge and said upper edge of said inflatable curtain.

17. Apparatus as defined in claim 16, wherein said second location is adjacent said upper edge of said inflatable curtain.

18. Apparatus as defined in claim 2, wherein said first location is on a pillar of the vehicle.

19. Apparatus as defined in claim 2, wherein said second location is on a pillar of the vehicle.

20. Apparatus as defined in claim 1, wherein said flexible elongated member is one of rope, webbing, and cable.

21. Apparatus as defined in claim 1, wherein said guide is a one-way slider that is easily slidable over said flexible elongated member in said first direction and that is blocked from sliding over said flexible elongated member in said second direction.

22. Apparatus as defined in claim 2, wherein said inflatable curtain when inflated extends along the side structure of the vehicle between at least two pillars of the vehicle.

23. Apparatus as defined in claim 22, wherein said inflatable curtain when inflated extends along the side structure of the vehicle between an A pillar and a C pillar of the vehicle.

24. Apparatus as defined in claim 2, wherein said inflatable curtain, when inflated, overlies at least a portion of an A pillar, a B pillar and a C pillar of the vehicle.

25. Apparatus as defined in claim 2, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

26. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

27. Apparatus as defined in claim 1, wherein said inflation fluid source comprises an inflator which is actuatable to inflate said inflatable vehicle occupant protection device.

* * * * *